United States Patent
Rea et al.

(10) Patent No.: US 7,199,085 B2
(45) Date of Patent: Apr. 3, 2007

(54) COLLOIDAL AND COLLOIDAL-LIKE SYSTEMS IN AQUEOUS, CLAY-BASED FLUIDS

(75) Inventors: Tony Rea, Houston, TX (US); Jack Cowan, Lafayette, LA (US); Tommy F. Brookey, Edmond, OK (US); Frederick B. Growcock, Houston, TX (US); Mike Kilchrist, Lafayette, LA (US)

(73) Assignee: MASI Technologies, Inc., Houston, TX (US)

( * ) Notice: Subject to any disclaimer, the term of this patent is extended or adjusted under 35 U.S.C. 154(b) by 398 days.

(21) Appl. No.: 10/842,002

(22) Filed: May 6, 2004

(65) Prior Publication Data

US 2005/0003967 A1  Jan. 6, 2005

Related U.S. Application Data

(60) Provisional application No. 60/468,405, filed on May 6, 2003.

(51) Int. Cl.
 *C09K 8/60* (2006.01)
(52) U.S. Cl. .......................... 507/202; 507/102
(58) Field of Classification Search ................ 507/102, 507/202
 See application file for complete search history.

(56) References Cited

U.S. PATENT DOCUMENTS

| | | | |
|---|---|---|---|
| 2,818,230 A | 12/1957 | Davis | |
| 3,900,420 A | 8/1975 | Sebba | |
| 3,956,040 A * | 5/1976 | Tezuka | 149/41 |
| 4,155,410 A | 5/1979 | Jackaon et al. | |
| 4,486,333 A | 12/1984 | Sebba | |
| 5,314,644 A | 5/1994 | Michelsen et al. | |
| 5,881,826 A | 3/1999 | Brookey | |
| 6,123,159 A | 9/2000 | Brookey et al. | |
| 6,148,917 A | 11/2000 | Brookey et al. | |
| 6,156,708 A | 12/2000 | Brookey et al. | |
| 6,390,208 B1 | 5/2002 | Brookey | |
| 6,422,326 B1 | 7/2002 | Brookey et al. | |
| 6,649,571 B1 | 11/2003 | Morgan | |
| 6,716,797 B2 | 4/2004 | Brookey | |
| 6,739,414 B2 | 5/2004 | Brookey et al. | |
| 6,770,601 B1 | 8/2004 | Brookey | |
| 2001/0027880 A1 | 10/2001 | Brookey | |

2003/0215946 A1  11/2003  Nair et al.

OTHER PUBLICATIONS

PCT International Search Report to Application #60/444,537, PCT/US04/02947 filed Feb. 3, 2004.
PCT International Search Report to Application #60/444,508, PCT/US04/02960 filed Feb. 3, 2004.
"Drill-In Fluids Improve High Angle Well Production," Supplement to the Petroleum Engineer International, pp. 5-11, Mar. 1995.
Sebba, Felix, "Foams and Biliquid Foams—Aphrons," (Ch. 5, pp. 63-78), John Wiley & Sons, 1987.
Nuculai Macovei, "Hidraulica Forajului," translation: YES, Oct. 26, 1982 pp. 444-455, Editura Tehnica, Bucuresti.
J.B. Melville and E. Matijevic, "Microbubbles: Generation and Interaction With Colloid Particles" Institute of Colloid and Surface Science and Department of Chemistry, Clarkson College of Technology, 1975 pp. 21-235, Potsdam, NY.
D. Roy, K.T. Valsarlj, and S.A. Kottai, "Separation of Organic Dyes From Wastewater by Using Colloidal Gas Aphrons" Marcel Dekker, Inc., Separation Science and Technology, 1992 pp. 573-589, 27 (5).
Tom Brookey, "Microbubbles: New Aphron Drill-in Fluid Technique Reduces Formation Damage in Horizontal Wells" ActiSystems, Inc., Society of Petroleum Engineers, Feb. 1819, 1998.
D. Roy, K.T. Valsaraj, and V.J. Amedee, "Treatability of Water-based Drilling Fluids Using Colloidal Gas Aphrons" Department of Civil Engineering and Chemical Engineering, Louisiana State University, Fluid/Particle Separation Journal, Mar. 1992 pp. 336,. vol. 5, No. 1.
Growcock, Frederick B., "Application of Water-Based and Oil-Based Aphrons in Drilling Fluids", Society of Petroleum Engineers, © 2003, Feb. 5-7, 2003, pp. 1-7.
Darley, H.C.H., and Gray, George R., "Composition and Properties of Drilling and Completion Fluids", © 1988, Chapter 4, pp. 140-183, Fifth Edition, Butterworth-Heinemann.
Darley, H.C.H., and Gray, George R., "Composition and Properties of Drilling and Completion Fluids", © 1988, Chapter 9, pp. 401-409, Fifth Edition, Butterworth-Heinemann.
Darley, H.C.H., and Gray, George R., "Composition and Properties of Drilling and Completion Fluids", © 1988, Chapter 11, pp. 542-617, Fifth Edition, Butterworth-Heinemann.

* cited by examiner

Primary Examiner—Philip C. Tucker
(74) Attorney, Agent, or Firm—Conley Rose P.C.

(57) ABSTRACT

The present invention generally relates to improved clay-based compositions comprising colloidal or colloidal-like phases (e.g., emulsions, aphrons) and methods of using those compositions. The compositions generally comprise an aqueous continuous phase, one or more palygorskite-sepiolite group clays, one or more surfactants, aphrons and optionally one or more Aphron Stabilizers. The compositions of the present invention are capable of being used in high-pressure applications.

43 Claims, No Drawings

COLLOIDAL AND COLLOIDAL-LIKE SYSTEMS IN AQUEOUS, CLAY-BASED FLUIDS

CROSS-REFERENCE TO RELATED APPLICATIONS

This application claims the benefit under 35 U.S.C. § 119(e) of U.S. Provisional Patent Application 60/468,405, filed May 6, 2003, and is related to commonly assigned, co-pending U.S. application Ser. No. 10/771,079 filed Feb. 3, 2004, entitled Stabilized Colloidal and Colloidal-like Systems.

STATEMENT REGARDING FEDERALLY SPONSORED RESEARCH OR DEVELOPMENT

Not applicable.

FIELD OF THE INVENTION

The present invention generally relates to compositions of matter and methods of using those compositions. More particularly, some of the embodiments of the present invention relate to clay-based compositions containing colloidal or colloidal-like phases (e.g., emulsions, aphrons) and methods of using such compositions.

BACKGROUND OF THE INVENTION

Formation damage due to invasion by drilling fluids is a well-known problem. Many zones contain formation clays, which hydrate when in contact with water, such as the filtrate from water-based drilling fluids. Hydrated clays may block the producing zones, so that oil and gas cannot move to the borehole and be produced. These zones may also be blocked or damaged by solids, which are carried into the openings with the drilling fluid. Blockage due to lodged solids may ultimately inhibit production of hydrocarbons.

Fluid invasion may be caused by the differential pressure between the equivalent circulating density (ECD) (hydrostatic pressure and fluid viscosity) and the formation pressure. The rate of invasion is controlled by the differential pressure, the fluid viscosity, the structure of the pore network in the rock and any fissures in the rock that may be present. Drillers have long used filtrate control mechanisms to reduce the movement of drilling fluids and filtrate into and through the formation openings. The mechanism generally involves the creation of a filter cake along the borehole wall. This technique still allows some fluid in and out of the zone. Although some fluid loss may be desirable to provide a favorable drilling rate, a fluid loss that is too high can result in costly mud bills and excessive cake thickness, which can lead to other problems, such as differential sticking of the drill string.

More recent technology has seen the development of Low Shear Rate Viscosity (LSRV) fluids. High LSRV is generated by the addition of specialized viscosifiers to water or brines to form a drilling fluid. These viscosifiers have a unique ability to create extremely high viscosity at very low shear rates. LSRV fluids have been widely used because of their solids suspension ability. They have been accepted as a way to minimize cuttings bed formation in high angle and horizontal wells, and as a way to reduce barite sag in deviated wells.

Recent studies and field experience indicate that high LSRV is helpful in controlling the invasion of filtrate by creating a high resistance to movement into the formation openings. Since the fluid moves at a very slow rate, viscosity becomes very high, and the depth of invasion of the fluid into the formation is kept shallow. This has been beneficial in protecting the zones from damage as well as reducing differential sticking in these fluids. (See, for example, the article entitled "Drill-In Fluids Improve High Angle Well Production", Supplement to the Petroleum Engineer International, March 1995).

Lost circulation (loss of whole drilling fluid) is also a severe problem in rotary drilling. Lost circulation occurs when the ECD is much greater than formation pressure. In the extreme case, ECD exceeds formation strength, and the rock fractures. Whether in pores or fractures, the openings in the rock are able to accept and store drilling fluid so that none is returned to the surface for recirculation. Whole drilling fluid is lost rapidly downhole and can become an expensive and dangerous problem. Lost circulation can lead to hole instability, stuck drill pipe, and loss of well control. At the least, lost circulation halts drilling operations and requires expensive replacement fluid volume to be used.

In addition to the fluid volume being lost, expensive lost circulation materials (LCM) are required. These are usually fibrous, granular, or flake materials such as cane fibers, wood fibers, cottonseed hulls, nut hulls, mica, cellophane, and many other materials. These LCM are added to the fluid system so that they may be carried into the loss zone and lodge to form a bridge on which other materials may build a seal akin to a filter cake. LCM themselves are damaging to the zones, and because they often must be carried in the drilling fluid to maintain circulation, solids removal is halted and buildup of solids in the mud results.

Methods of correcting lost circulation of drilling fluids by aerating the drilling fluids are set forth in U.S. Pat. No. 2,818,230 (Davis) and U.S. Pat. No. 4,155,410 (Jackson). However, traditional aerated fluids also have disadvantages. Problems with these fluids include hole cleaning, control of formation fluids and corrosion. Standard pumping equipment will experience cavitation, so that expensive, often hard-to-get equipment such as compressors and boosters are required. In addition, such fluids are not recirculateable and must be constantly generated as the drilling proceeds.

In light of the deficiencies of the prior methods, there is still a great need for fluids that can rapidly seal formation fractures and/or inhibit the excessive loss of drilling fluids. In particular, some attractive fluid based systems incorporate aphrons, which are described in U.S. Pat. Nos. 5,881,826, 6,123,159, 6,148,917, 6,156,708, 6,390,208, 6,422,326 and PCT WO 98/36151.

SUMMARY OF THE INVENTION

In accordance with the spirit of the present invention, novel clay-based fluids comprising colloidal or colloidal-like phases (e.g., emulsions, aphrons) are described herein. One property of clay-based fluids comprising aphrons is their ability to seal openings in a formation during drilling or other downhole operations. These fluids are capable of being recirculated in the wellbore during drilling or other downhole activities.

Several embodiments are disclosed as being illustrative of the spirit of the invention. For example, in one embodiment, the fluid composition comprises an aqueous fluid, one or more palygorskite-sepiolite group clays, one or more surfactants, aphrons, and optionally one or more Aphron Stabilizers. Without wishing to be bound by a theory, it is believed that the use of palygorskite-sepiolite group clays achieves a LSRV in the fluid that is comparable to LSRVs currently achieved by polymers, thus allowing cheaper drilling fluids to be produced without sacrificing performance.

Methods of use for aphron containing clay-based fluids are also described herein. For example, the fluids can be used to assist in the effective sealing of the formation. These and other embodiments of the present invention, as well as their features and advantages, will become apparent with reference to the following detailed description.

NOTATION AND NOMENCLATURE

In the following discussion and in the claims, the terms "including" and "comprising" are used in an open-ended fashion, and thus should be interpreted to mean "including, but not limited to . . . ." Certain terms are used throughout the following description and claims to refer to particular system components. For example, "bulk fluid" is intended to mean the fluid composition as a whole, including the aqueous fluid and any species that may be added to it. "Bulk viscosity" is intended to refer to the viscosity, or the property of resistance to flow, in the bulk fluid.

DETAILED DESCRIPTION OF THE PREFERRED EMBODIMENTS

The present invention generally relates to clay-based compositions having colloidal or colloidal-like phases and methods of using those compositions. Although various embodiments of the present invention will be discussed herein, the fundamental idea is to provide thixotropic, long-lasting compositions and methods for preparing and using such compositions. Some embodiments of the present invention relate to fluid compositions and methods of use of aphron containing clay-based fluids in downhole applications. In particular, it is wholly within the scope and spirit of the invention for the detailed compositions disclosed herein to be circulated in the column while drilling, logging, workover, servicing, or any other downhole operation is occurring. However, downhole applications are not contemplated as the only use for the compositions of the present invention, and the invention should not be so limited. Thus, it should be appreciated that the compositions, form of the compositions, and methods of use for the compositions provided herein are only for the sake of clarity and in the interest of presenting embodiments of the present invention.

As will be shown herein, these clay-based fluids have many advantages and uses, such as assisting in the effective sealing of the formation, including sealing microfractured and large fractured zones.

Fluid systems containing aphrons are known in the art. In general, an aphron-containing drilling fluid combines the use of LSRV-generating viscosifiers with surfactants to form aphrons. The aphrons can be obtained, for example, (1) by incorporating an aphron-generating surfactant into the fluid and thereafter generating the aphrons in the fluid by introducing into it a gas or (2) by generating the aphrons in a liquid compatible with the fluid and mixing the two fluids together. The book by Felix Sebba entitled "Foams and Biliquid Foams—Aphrons," John Wiley & Sons, 1987, incorporated herein by reference, is an excellent source on the preparation and properties of aphrons, ie., microbubbles. Aphron-containing fluids are an improvement to the problems associated with traditional aerated fluids.

An aphron is typically made up of a spherical core or internal phase, which is usually gas encapsulated in a thin shell. This shell contains surfactant molecules positioned so that they produce an effective first barrier against a second phase comprised of viscosified water. The second phase also contains surfactant molecules positioned so that the hydrophobic portion of the molecules extend into a third phase. The latter contains still another layer of surfactant molecules aligned with the hydrophilic (polar) extending into the bulk fluid. Thus, the second phase is a bi-layer of surfactant molecules, which serves as an effective barrier to coalescence with adjacent aphrons. In summary, the gas core is stabilized by three layers of surfactant molecules and a viscosified aqueous layer. It is believed that the outermost surfactant layer is not strongly associated with the rest of the aphron and may be shed when aphrons are forced against each other, thereby leading to agglomeration but not coalescence.

Recently, compositions and methods of use that are an improvement over the existing aphron technology have been produced. As disclosed in U.S. application Ser. No. 10/771, 079, entitled Stabilized Colloidal and Colloidal-like Systems, it has been discovered that the use of an Aphron Stabilizer may convert the viscosified aqueous layer in an aphron into a tough elastomeric membrane.

Suitable Aphron Stabilizers disclosed include the following compositions: biopolymer/magnesium oxide/sodium chloride, polyacrylamide/chromic acetate, doubly derivatized HEC/$Fe^{2+}$, liquid rubber bases, liquid wax bases, water soluble glues (e.g. Elmer's glue), polyvinyl alcohol (PVOH)/alkyl ether sulfates, PVOH/betaines, and mixtures thereof.

Aphron generation can be accomplished by any means known in the art, such as methods described in the book by Felix Sebba mentioned above. Two major components for creating aphrons are surfactants and viscosifiers. The surfactants are responsible for the formation of the aphrons' unique layers. These surfactants must be arranged in such a way that the aphron structure is compatible with the base liquid and the viscosifier therein such that the LSRV of the fluid can be maintained. The aphron-generating surfactant may be anionic, non-ionic, or cationic depending on compatibility with the viscosifier. Anionic surfactants include, for example, alkyl sulfates, alpha olefin sulfonates, alkyl (alcohol) ether sulfates, refined petroleum sulfonates, and mixtures thereof. Non-ionic surfactants include, for example, ethoxylated alcohols and amine oxides. Cationic surfactants include, for example, quaternary salts.

Generally, stable aphron-containing fluids are obtained by increasing the LSRV of the fluid to at least 10,000 centipoise (cP) (Brookfield viscosity at 0.06 $sec^{-1}$). Because the stability of the aphrons is enhanced as the LSRV increases, a LSRV of more than 100,000 cP may be desired. This is accomplished with appropriate viscosifiers. In general, conventional viscosifiers have included organic polymers; inorganic polymers; dispersed bentonite clays; dispersed minerals; mixed metal hydroxides, oxyhydroxides and oxides; biopolymers; water-soluble synthetic polymers; other types of polymers; and mixtures thereof. Many conventional viscosifiers are listed in U.S. Pat. Nos. 5,881,826, 6,123,159, 6,148,917, 6,156,708, 6,390,208, 6,422,326 and PCT/US98/02566.

The present invention introduces the use of palygorskite-sepiolite group clays as an alternative to conventional viscosifiers. The palygorskite-sepiolite clay family comprises a group of fibrous or needle-like hydrous magnesium silicate clays including palygorskite (commonly known as attapulgite), tuperssuatsiaite, yofortierite, kalifersite, sepiolite, falcondoite, and loughlinite. Palygorskite typically has short (<2 μm) and low-aspect-ratio (<10:1) needles. Sepiolite generally has longer, more flexible needles.

Most palygorskite-sepiolite group clay is dry-processed for absorbent and rheological uses. Small quantities are hydroclassified for personal products and pharmaceutical applications. Although there are differences in the performance of palygorskite and sepiolite, they are relatively minor. The choice between the two is usually decided by local availability. Palygorskite-sepiolite dispersions are alkaline in pH, with less cohesive colloidal structures than those produced by smectite clays (e.g. bentonite) since these structures are not based on ionic bonds.

When palygorskite-sepiolite group clays are dispersed in water, they do not swell like smectite clays, but deagglomerate in proportion to the amount of shear applied, and form a random lattice of fibers that entraps the water. This loosely cohesive structure offers shear-thinning rheological properties even greater than those of smectite clays.

Because a dispersion of palygorskite-sepiolite group clay is mechanically rather than osmotically driven, it is unaffected by the presence of solutes. Likewise, since the palygorskite-sepiolite fibrous structure does not depend on ionic attraction, it is insensitive to subsequently added solutes and exhibits broad pH stability. The viscosity and yield value of palygorskite-sepiolite dispersions are unaffected by temperature, microorganisms, enzymes or UV light.

Without wishing to be bound by any particular theory, it is believed that the fibrous structure of the palygorskite-sepiolite group clays allows stable suspensions of high viscosity at relatively low concentration. As a result, suspensions containing palygorskite-sepiolite group clays display non-Newtonian behavior and impart high LSRV to fluids.

As set forth in the "Summary of the Invention," the fluid composition in one embodiment of the present invention comprises an aqueous fluid, one or more palygorskite-sepiolite group clays, one or more surfactants, aphrons, and optionally one or more Aphron Stabilizers.

The surfactant, materials associated with the surfactant, the gas in the core of the aphrons, and any additional viscosifiers may be selected from suitable species known in the art and disclosed above. The fluid compositions may additionally contain weighting agents, corrosion inhibitors, soluble salts, biocide, fungicides, seepage loss control additives, bridging agents, deflocculants, lubricity additives, shale control inhibitors, foam suppressors, and other additives as desired.

The aqueous liquid may be fresh water, sea water, or a brine containing soluble salts such as sodium chloride, potassium chloride, calcium chloride, magnesium chloride, sodium bromide, potassium bromide, calcium bromide, zinc bromide, sodium formate, potassium formate, cesium formate, and mixtures thereof. The brine may contain one or more soluble salts at any desired concentration.

In addition, if necessary, air or other gases can be incorporated into the fluid to entrain more gas for forming aphrons. The gas may be any gas that is not appreciably soluble in the liquid phase of the fluid. For example, the gas may be air, nitrogen, carbon dioxide, organic gases, and the like, including air encapsulated in the fluid during mixing.

As stated above, various embodiments of the invention may comprise Aphron Stabilizers. Aphron Stabilizers may comprise polyvinylalcohol and a betaine or an alkyl ether sulfate and mixtures thereof. In one embodiment, the Aphron Stabilizer comprises from about 0.05% to about 2% of the net weight of the fluid composition, preferably from about 0.1% to 1%.

The following "Example" sections highlight the performance of the clay-based fluids made in accordance with the present invention.

EXAMPLE

1$^{st}$ Generation

Three different bulk fluid compositions were prepared. A list of the components used is given in Table 1. The resultant PVs (Fann 35 Reading at 600 rpm—Reading at 300 rpm) and high shear rate viscosities (HSRVs) (Fann 35 Reading at 300 rpm (viscosity at 511 sec$^{-1}$)) at 120° F. and LSRVs (Brookfield viscosity at 0.06 sec$^{-1}$) at room temperature are given in Table 2.

TABLE 1

Bulk Fluid Compositions

| | Composition | | |
|---|---|---|---|
| Component | Ex. 1 Bentonite-based | Ex. 2 Xanthan-based | Ex. 3 Attapulgite-based |
| Fresh Water (mL) | 350 | 350 | 350 |
| Clay blend 1 (g) | 25 | 0 | 0 |
| Clay blend 2 (g) | 0 | 0 | 24 |
| Polymer blend (g) | 0 | 25 | 0 |
| Hemi Powder (g) | 6.0 | 0 | 6.67 |
| My-Lo-Jel (g) | 2.0 | 0 | 2.66 |
| Soda Ash (g) | 5.0 | 0 | 6.67 |
| Shale Inhibitor (mL) | 0.5 | 0.5 | 0.5 |
| Surfactant (mL) | 0.5 | 0.5 | 0.5 |

TABLE 2

PV, HSRV and LSRV for Bulk Fluids

| | Ex. 1 | Ex. 2 | Ex. 3 |
|---|---|---|---|
| PV (cP) | 20 | 13 | 10 |
| LSRV (cP) | 46,100 | 34,200 | 45,300 |
| HSRV (cP) | 29 | 52 | 20 |

Referring to Table 1, clay blend 1 is a bentonite clay-based blend comprised of montmorillonite of about 85% purity, sold by Baker Hughes INTEQ under the name Gel Bentonite as API Drilling Fluid Grade Bentonite. Clay blend 2 is an attapulgite clay-based blend comprised of approximately 89 wt % dry attapulgite clay and 11 wt % moisture and impurities, sold by Floridin (a division of ITC Industrials) under the tradename Florigel HY™. The polymer blend used is a xanthan gum-based blend comprised of approximately 10.2 wt % xanthan gum, 24.5 wt % starch, 24.5 wt % Hemi Powder and 40.8 wt % soda ash. Hemi Powder is a hemicellulose polymer sold by MASI Technologies L.L.C., a joint venture between M-IL.L.C. and ActiSystems Inc. My-Lo-Jel™ is a pregelatinized corn starch of 90% purity sold by M-ILLC. The surfactant used is an alcohol ether sulfate-based blend comprised of approximately 18 wt % alcohol ether sulfate, 8 wt % cocobetaine, 1 wt % hydroxypropylguar, and 73 wt % water, sold by MASI Technologies L.L.C., under the tradename Blue Streak™. The shale inhibitor is a cottonseed oil-based blend, which is comprised of approximately 61 wt % cottonseed oil, 36 wt % lecithin, and 3 wt % Tergitol 15-S-5™ (an alkyloxypolyethyleneoxyethanol from Dow Chemical Co.), sold by MASI Technologies L.L.C., under the tradename Actiguard™.

All the components listed in Table 1 are believed to have a primary function in the resultant fluids. For example, the soda ash is believed to be a hardness buffer and the polymer blend or the clay blends are believed to be the primary viscosifiers of the bulk fluid. The Hemi Powder is believed to be a thermal stabilizer and filtration control additive. My-Lo-Jel functions as a filtration control additive, and the surfactant is believed to serve as the aphron generator.

As is known, plastic viscosity (PV) is a key parameter in drilling fluids. A low PV indicates that the drilling fluid is capable of drilling rapidly because of the low viscosity of drilling fluid exiting at the drill bit. Thus, low PV can enhance rate of penetration (ROP) during drilling. High PV is caused by a viscous base fluid and by excess colloidal solids. To lower PV, a reduction in solids content can be achieved by dilution of the drilling fluid. PVs can be as high 100 cP, but it is preferred that the PVs be less than 25 cP.

Referring now to Table 2, Ex #1 has a PV of 20 cP, Ex #2 has a PV of 13 cP, and Ex #3 has a PV of 10 cP. While all three examples have acceptable PVs, Ex #3 (attapulgite viscosfier) has the most preferred PV value. Ex #3 has a PV that is 10 cP lower than Ex #1 (bentonite clay viscosifier) and 3 cP lower than Ex #2 (xanthan polymer viscosifier). It is noted that while the PV of Ex #3 is lower, Ex #2 may actually have a slightly lower PV than Ex #3 when the concentrations of the components are similar (while 25 g of xanthan-blend is used, only about 2.5 g of xanthan is present).

In Table 2, Ex #3 has a similar LSRV to Ex #1 and a higher LSRV than Ex # 2. As stated above, generally, stable aphron-containing fluids are obtained by increasing the LSRV of the fluid to at least 10,000 cP. Preferred LSRVs are in the range of approximately 40,000 to 150,000 cP, with the higher values being the most preferred.

HSRV describes fluid viscosity at very high shear rates. Preferred HSRVs are less than about 100 cP, with values lower than 70 cP being most preferred.

A fluid composition having a low HSRV and a high LSRV is preferred for a number of reasons. Firstly, in fluid compositions having a low HSRV, the ECD is low, and therefore the fluid may be pumped with low stress into the wellbore. Secondly, fluid compositions having a high LSRV are more stable because high LSRV helps to stabilize the aphrons (i.e. high LSRV prevents the aphrons from aggregating, separating and coalescing). Also, high LSRV slows the flow of drilling fluid through loss zones, thereby resulting in less seepage into the zones.

Still referring to Table 2, the use of palygorskite-sepiolite group clays in fresh water has not been described previously. To date, palygorskite-sepiolite group clays have been generally used in salt water systems because they are known for being able to develop viscosity in salt water; in fact, sepiolite and attapulgite are often referred to as "salt gel." The inventors have discovered that palygorskite-sepiolite group clays exhibit high LSRVs in fresh water as well as salt water.

EXAMPLE

2$^{nd}$ Generation

Based on the results from the 1$^{st}$ generation fluids, two second-generation bulk fluid compositions were prepared. A list of the components used is given in Table 3. The resultant PVs (Fann 35 Reading at 600 rpm—Reading at 300 rpm), HSRVs (Fann 35 Reading at 300 rpm (viscosity at 511 sec$^{-1}$)), and LSRVs (Brookfield viscosity at 0.06 sec$^{-1}$), all at 120° F., are given in Table 4.

TABLE 3

Bulk Fluid Compositions

| | Composition | |
|---|---|---|
| Component | Ex. 4 Sepiolite-based | Ex. 5 Sepiolite-based |
| Fresh Water (bbl) | 336 | 336.3 |
| Clay blend 3 (ppb) | 25 | 25 |
| Actipack (ppb) | 3.0 | 2.0 |
| Caustic Soda (ppb) | 1.5 | 1.5 |
| Polymer blend (ppb) | 0 | 0.25 |
| Soda Ash (ppb) | 0.25 | 0.25 |
| Shale Inhibitor (ppb) | 0.2 | 0.2 |
| Surfactant (ppb) | 0.5 | 0.5 |

TABLE 4

PV, HSRV and LSRV for Bulk Fluids

| | Ex. 4 | Ex. 5 |
|---|---|---|
| PV (cP) | 7 | 9 |
| LSRV (cP) | 92,400 | 120,000 |
| HSRV (cP) | 27 | 36 |

Referring to Table 3, clay blend 3 is a sepiolite-based clay blend comprised of approximately 82 wt % sepiolite clay from IMV Nevada, 1.7 wt % XCD™, and 16.3% soda ash, sold by MASI Technologies L.L.C., under the tradename Activis LSR™. XCD™ is a xanthan-based blend comprised of approximately 99 wt % xanthan gum polymer and 1 wt % residue sold by Kelco Oilfield Group. The Actipack used is a Hemi Powder-based blend comprised of approximately 40 wt % Hemi Powder, 30 wt % starch, and 30 wt % soda ash, sold by MASI Technologies L.L.C., under the tradename Actipack™. The polymer blend used is a xanthan-based blend comprised of approximately 99 wt % xanthan gum polymer and 1 wt % residue, sold by M-IL.L.C., under the tradename DuoViS™. The surfactant used is Blue Streak™ and the shale inhibitor used is Actiguard™.

All the components listed in Table 3 are believed to have a primary function in the resultant fluids. For example, the soda ash is believed to be a hardness buffer and the clay blend is believed to be the primary viscosifier of the bulk fluid. The caustic soda is believed to be a alkalinity control agent, the Actipack™ is believed to be a thermal stabilizer and filtration control agent, the polymer blend is believed to be a secondary viscosifier, and the surfactant is believed to serve as the aphron generator.

Referring now to Table 4, both Ex #4 and Ex #5 have highly desirable PV values, 7 cP and 9 cP, respectively. Both Ex #4 and Ex #5 also have highly desirable LSRV values of greater than 90,000 cP. Also, both Ex #4 and Ex #5 have high LSRV and low HSRV values.

The fluid compositions may have a pH in the range from about 7.0 to 12, preferably from about 9.0 to about 10.5. The pH can be obtained (as is well known in the art) by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. As shown in Table 3, sodium hydroxide (caustic soda) is a preferred alkalinity control agent.

In addition to the components listed in Tables 1 and 3, other additives including foam suppressors and thinners may be used if desired. Examples of suitable foam suppressors include oligomers such as glycol ether and propylene glycol and examples of suitable thinners include causticized lignite and chrome-free lignosulfonate.

An Aphron Stabilizer may also be used if desired. A preferred Aphron Stabilizer includes a PVOH-based blend comprised of approximately 30 wt % PVOH, 6 wt % cocamidopropyl betaine (CAPV), and 64 wt % water. When present, the Aphron Stabilizer is believed to be a cross-linkable polymer which becomes cross-linked or interacts strongly with the other materials present in the viscosified water layer of the aphrons.

In Examples 1–2, aphron generation was accomplished by entraining air under ambient conditions with a Silverson LV-4 mixer with disintegrator head rotating at 7000 rpm for 6 min. Alternatively, the aphrons can be generated using the procedures and equipment taught by Sebba in U.S. Pat. No. 3,900,420 and Donald Michelsen in U.S. Pat. No. 5,314,644. The fluid containing the aphrons can then be continuously directed to a desired location.

The quantity of aphrons in the fluids may be determined by the % Entrained Air in the fluid, which in turn is determined from the relative density of the bulk fluid do compared to its gas-free theoretical density $d_t$:

% Entrained Air=$[(d_t-d_0)/d_t] \times 100$

In one embodiment, the % Entrained Air is maintained between about 10% to about 20% of the net volume of the fluid, preferably from about 12% to 18%. The density of the bulk fluid can be monitored and additional surfactant and aphron generator can be added as necessary to maintain the desired density.

In one embodiment, the present invention is intended to help prevent the loss of circulating fluid into the formation by incorporating the aphrons into a clay-based drilling or servicing fluid or any other type of clay-based downhole fluid. The present invention is not limited to any particular type of formation. The embodiments of the invention can be useful for promoting sealing of all types of formation zones where fluid can be lost. For example, the present invention can be useful in sealing or enhancing sealing of formation fractures. As noted above, formation fractures vary in size and shape from microscopic to small caves. For smaller fractures, i.e., about 10 µm or less, normal drilling fluid sealants can be effective, but the present invention may be used as an enhancement to strengthen, stabilize or reduce the time necessary to build the plug.

In addition to or in place of agitation or mixing and/or dilution, an additive can be incorporated into the bulk fluid that helps maintain uniform distribution of the aphrons. Additives can also help maintain pumpability of the fluid. The more preferred additives are secondary viscosifiers. Suitable secondary viscosifiers are limited only by their compatibility with the base fluid and the aphrons and should exhibit LSRV and/or suspension properties. For example, in aqueous based fluids, any water-soluble viscosifier would suffice, e.g., organic, inorganic or biopolymers, clays, or other polymer-like chemicals. In a preferred embodiment, a LSRV biopolymer is added to the fluid. The preferred biopolymers according to the present invention comprise a xanthan gum.

Also provided herein are methods of using the above-mentioned compositions. In one embodiment, a fluid composition comprising an aqueous fluid, one or more palygorskite-sepiolite group clays, one or more surfactants, aphrons, and optionally one or more Aphron Stabilizers, is pumped downhole at elevated pressures, e.g., 2,000+ psi, using a cavitating pump. The aphrons are formed from dissolved gas in the fluid composition or from air entrained at ground level under ambient conditions. In some embodiments, the aphrons are stable even under elevated pressures of greater than or equal to about 2,000 psi, preferably stable at pressures of greater than or equal to about 5,000 psi, and more preferably stable at pressures of greater than or equal to about 8,000 psi.

During drilling, the aphrons are compressed due to the excess pressure of the column, and the aphrons enter the formation fractures. The pressure is less within the fractures allowing the aphrons to expand. The expansion of the aphrons, coupled with their aggregation within the fracture, can effectively fill and seal the fracture. In some embodiments, the aphrons preferably have a half-life of greater than or equal to about 20 hours, more preferably have a half-life of greater than or equal to about 75 hours, and still more preferably have a half-life of greater than or equal to about 150 hours. In some embodiments, the aphrons have a half-life exceeding about 200 hours.

In some embodiments, a fluid containing aphrons which enters the formation is clean and essentially solids-free such that damage of the formation is significantly less than with solids-containing fluids. Since no solids or particles are involved in this method, solids removal equipment can be used to keep the fluid as clean as possible.

While preferred embodiments of this invention have been shown and described, modification thereof can be made by one skilled in the art without departing from the spirit or teaching of this invention. The embodiments described herein are exemplary only and are not limiting. Many variations and modifications of the compositions and methods are possible and are within the scope of this invention. For example, it is completely within the spirit and scope of the present invention for the various fluid compositions described herein to be mixtures of each other. Accordingly, the scope of protection is not limited to the embodiments described herein, but is only limited by the claims, the scope of which shall include all equivalents of the subject matter of the claims.

What is claimed is:

1. A fluid composition for downhole use in a well, comprising:
   an aqueous liquid as the continuous phase;
   one or more surfactants;
   aphrons; and
   one or more viscosifiers selected from the group of palygorskite-sepiolite clay family members consisting of palygorskite, tuperssuatsiaite, yofortierite, kalifersite, sepiolite, falcondoite, loughlinite and mixtures thereof, wherein the composition has a pH of from about 7 to about 12.

2. The composition according to claim 1 further comprising one or more aphron stabilizers.

3. The composition according to claim 2 wherein at least one of the aphron stabilizers comprises a cross-linkable polymer.

4. The composition according to claim 2 wherein at least one of the aphron stabilizers comprises polyvinyl alcohol, betaine, alkyl ether sulfate and mixtures thereof.

5. The composition according to claim 2 wherein the composition comprises from about 0.05% to about 2% by weight aphron stabilizer.

6. The composition according to claim 2 wherein the aphrons have an average half-life of greater than or equal to about 20 hours.

7. The composition according to claim 2 wherein the aphrons have an average half-life of greater than or equal to about 75 hours.

8. The composition according to claim 2 wherein the aphrons have an average half-life of greater than or equal to about 150 hours.

9. The composition according to claim 2 wherein the aphrons are stable at pressures of greater than or equal to about 2,000 psi.

10. The composition according to claim 2 wherein the aphrons are stable at pressures of greater than or equal to about 5,000 psi.

11. A fluid composition for downhole use in a well, comprising:
an aqueous liquid as the continuous phase;
one or more surfactants;
aphrons; and
one or more viscosifiers selected from the group of palygorskite-sepiolite clay family members consisting of palygorskite, tuperssuatsiaite, yofortierite, kalifersite, sepiolite, falcondoite, loughlinite and mixtures thereof, wherein the composition can be continuously recirculated.

12. The composition according to claim 11 wherein the aphrons prevent loss of excess fluid into a formation.

13. The composition according to claim 11 wherein the aphrons effectively seal a formation.

14. The composition according to claim 11 wherein the downhole use includes drilling, logging, workover and servicing operations.

15. A process for drilling or servicing a wellbore in a subtenanean formation wherein a drilling or servicing fluid is circulated in the wellbore, comprising:
utilizing as the drilling or servicing fluid an aqueous liquid as the continuous phase, one or more surfactants, aphrons, and one or more viscosifiers selected from the group of palygorskite-sepiolite clay family members consisting of, palygorskite, tuperssuatsiaite, yofortierite, kalifersite, sepiolite, falcondoite, loughlinite and mixtures thereof.

16. The process according to claim 15 wherein the drilling or servicing fluid further comprises one or more aphron stabilizers.

17. The process according to claim 16 wherein at least one of the aphron stabilizers comprises polyvinyl alcohol, betaine, alkyl ether sulfate and mixtures thereof.

18. The process according to claim 16 wherein the aphrons have an average half-life of greater than or equal to about 20 hours.

19. The process according to claim 16 wherein the aphrons have an average half-life of greater than or equal to about 75 hours.

20. The process according to claim 16 wherein the aphrons have an average half-life of greater than or equal to about 150 hours.

21. The process according to claim 16 wherein the aphrons have an average half-life of greater than or equal to about 200 hours.

22. The process according to claim 16 wherein the aphrons are stable at pressures of greater than or equal to about 2,000 psi.

23. The process according to claim 16 wherein the aphrons are stable at pressures of greater than or equal to about 5,000 psi.

24. The process according to claim 15 wherein at least one of the viscosifiers comprises palygorskite, sepiolite and mixtures thereof.

25. The process according to claim 15 wherein the drilling or servicing fluid has a low shear rate viscosity as measured by a Brookfield Viscometer at 0.06 sec$^{-1}$ of at least 10,000 centipoise.

26. The process according to claim 15 wherein the drilling or servicing fluid has a low shear rate viscosity as measured by a Brookfield Viscometer at 0.06 sec$^{-1}$ of at least 50,000 centipoise.

27. The process according to claim 15 wherein the drilling or servicing fluid has a plastic viscosity as measured by subtracting a Fann 35 reading at 300 rpm from a Fann 35 reading at 600 rpm of less than 25 centipoise.

28. The process according to claim 15 wherein the drilling or servicing fluid has a plastic viscosity as measured by subtracting a Fann 35 reading at 300 rpm from a Fann 35 reading at 600 rpm of less than 10 centipoise.

29. The process according to claim 15 wherein the drilling or servicing fluid has a high shear rate viscosity as measured by a Fann 35 reading at 300 rpm of less than 100 centipoise.

30. The process according to claim 15 wherein the drilling or servicing fluid has a high shear rate viscosity as measured by a Fann 35 reading at 300 rpm of less than 70 centipoise.

31. The process according to claim 15 wherein the aphrons comprise from about 10% by volume to about 20% by volume of the drilling or servicing fluid.

32. The process according to claim 15 wherein the drilling or servicing fluid can be continuously recirculated.

33. The process according to claim 15 wherein the aphrons prevent loss of excess drilling or servicing fluid into the formation.

34. A fluid composition for downhole use in a well, comprising:
an aqueous liquid as the continuous phase;
one or more surfactants;
aphrons;
one or more aphron stabilizers; and
one or more viscosifiers selected from the group of palygorskite-sepiolite clay family members consisting of, palygorskite, tuperssuatsiaite, yofortierite, kalifersite, sepiolite, falcondoite, loughlinite and mixtures thereof.

35. The composition according to claim 34 wherein at least one of the viscosifiers comprises palygorskite, sepiolite and mixtures thereof.

36. The composition according to claim 34 wherein the composition has a low shear rate viscosity as measured by a Brookfield Viscometer at 0.06 sec$^{-1}$ of at least 10,000 centipoise.

37. The composition according to claim 34 wherein the composition has a low shear rate viscosity as measured by a Brookfield Viscometer at 0.06 sec$^{-1}$ of at least 50,000 centipoise.

38. The composition according to claim 34 wherein the composition has a plastic viscosity as measured by subtracting a Fann 35 reading at 300 rpm from a Fann 35 reading at 600 rpm of less than 25 centipoise.

39. The composition according to claim 34 wherein the composition has a plastic viscosity as measured by subtracting a Fann 35 reading at 300 rpm from a Fann 35 reading at 600 rpm of less than 10 centipoise.

40. The composition according to claim 34 wherein the composition has a high shear rate viscosity as measured by a Fann 35 reading at 300 rpm of less than 100 centipoise.

41. The composition according to claim 34 wherein the composition has a high shear rate viscosity as measured by a Fann 35 reading at 300 rpm of less than 70 centipoise.

42. The composition according to claim 34 wherein the composition can be continuously recirculated.

43. The composition according to claim 34 wherein the aphrons prevent loss of excess fluid into a formation.

* * * * *